Dec. 24, 1935.                J. A. ZUBLIN                2,025,259
                                DRILL BIT
                           Filed Aug. 29, 1934
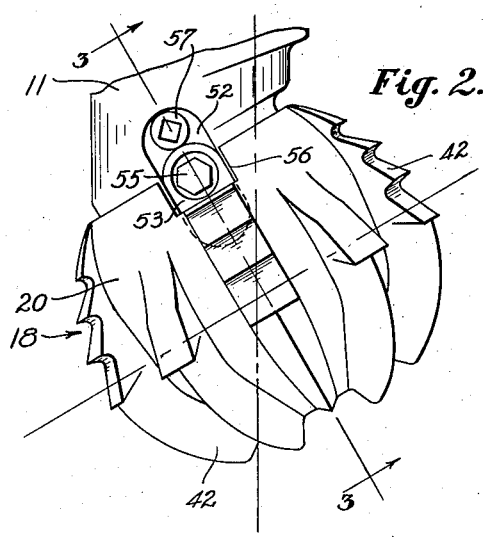
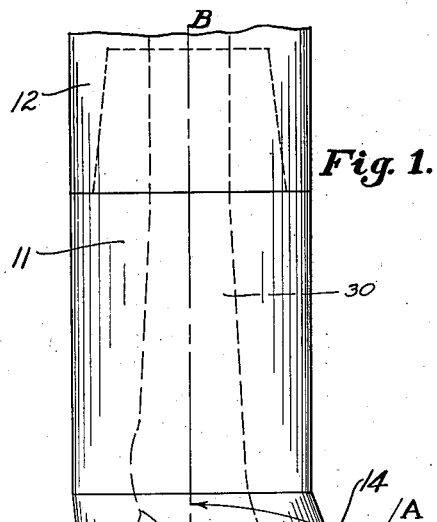
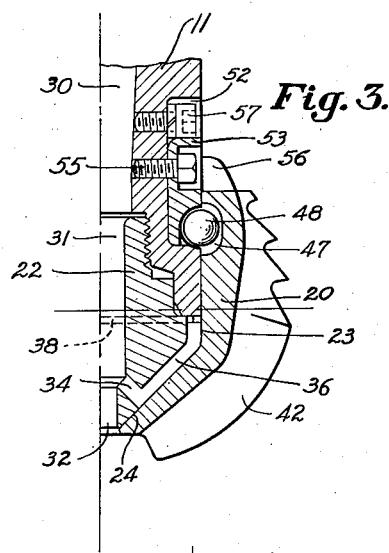
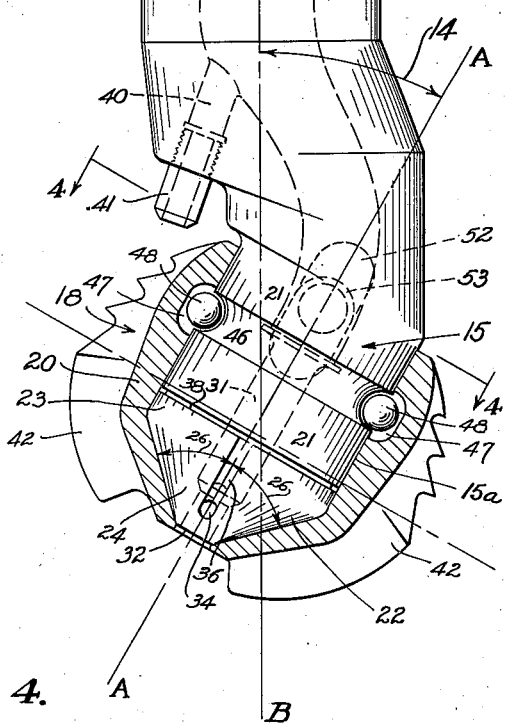
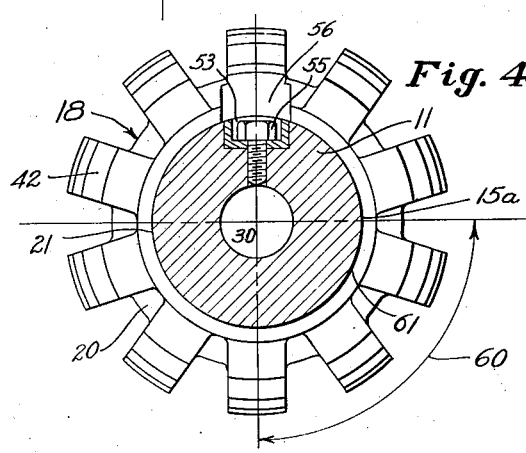
JOHN A. ZUBLIN
INVENTOR
BY
ATTORNEY Patented Dec. 24, 1935

2,025,259

UNITED STATES PATENT OFFICE 2,025,259

DRILL BIT

John A. Zublin, Bel Air, Calif.

Application August 29, 1934, Serial No. 741,913

19 Claims. (Cl. 255—71)

The present invention relates generally to drill bits for drilling oil wells, and more especially to bits of the general class wherein a cutter is rotatably mounted on a bearing that is secured to or forms a part of the bit shank attached to the drill column, the cutter bearing being inclined to the shank axis, which is normally vertical.

In bits of this type, the great weight of the drill pipe above the bit causes relatively high unit pressures on the cutter bearing and this is attended by high friction between the bearing surfaces. Previous attempts to eliminate the friction and consequent wear have included the use of oil lubrication and roller or ball bearings. However, these devices have inherent shortcomings that make them unsuitable for some heavy duty work.

The sturdiest and most reliable bearing is a simple journal, with the cutter having a relatively large bearing surface on the shank. Circulating mud forced through the bearing provides an adequate cooling and lubricating medium without which the parts would become excessively hot and warp out of shape.

Because this circulating mud serves to lift cuttings out of the hole, it normally carries a considerable amount of finely divided abrasive material, such as quartz, which wears away the bearing. Hence, even under favorable conditions, the bearing is subject to a great deal of wear that soon results in a very loose fit between cutter and shank, and the looseness of the fit usually redistributes the pressure on the bearing to concentrate it over but a small fraction of the total bearing area. The uneven distribution, naturally, increases the wear of the cutter at an accelerated rate.

It is, therefore, a general object of my invention to provide a cutter bearing of increased serviceability and life in which the bearing pressure and the wear are always distributed in substantially the same manner over the bearing so that wear occurs at a uniform rate throughout the life of the bearing.

Another object is to provide a cutter bearing of such design that it will, in part, wear in to a better fit than when first assembled, and will retain this close fit throughout its useful life.

And it is also an object to provide a bearing in which the surfaces of the shank and cutter are, as far as possible, peripherally continuous in order to have bearing contact at all times between the parts, and especially at points of heavy pressure.

These objects are attained in a bit constructed according to my invention by providing on the shank a self-centering bearing having its axis inclined to the shank axis, the bearing comprising a cylindrical portion and a co-axial conical portion below the cylindrical portion, the two portions forming a unitary bearing to take axial and radial thrust.

The cone central angle is large enough to prevent binding, and is such that the cone sides slope downwardly and inwardly, with the result that the drilling weight produces a force parallel to the cone sides that keeps the cutter and bearing centered one on the other. Locking means holds the cutter gainst removal axially from the bearing, but the cutter is permitted a limited axial movement on the bearing.

The locking means includes a ball-holding channel and a lock plug holding balls in the channel. This plug is positioned on the shank at a point of minimum wear so the places of maximum wear fall on the shank itself; also the plug surface forms a continuation of the bearing surface so the bearing is in effect continuous.

Because my invention is particularly applicable to bits of the type shown in my prior Patents 1,758,773 and 1,758,814, issued May 5, 1930, it is here shown as embodied in such a bit; but it will be understood that the invention is not necessarily limited thereby to the specific bit assembly illustrated, for, as will become evident, it can be applied to other drill bits.

How these and other objects and advantages of my invention are attained will be more readily understood from the following description and the annexed drawing, in which:

Fig. 1 is a side elevation of a drill bit, with the cutter shown in section;

Fig. 2 is a fragmentary elevation of a cutter and a portion of the shank as viewed from the side opposite that seen in Fig. 1;

Fig. 3 is a semi-section on axis A—A as indicated by arrows 3—3 of Fig. 2; and

Fig. 4 is a plan view on line 4—4 of Fig. 1.

Fig. 1 shows a completely assembled bit having a shank portion 11 that is threaded into drill collar 12 on the lower end of a drill column which rotates the bit. The bottom of shank 11 terminates in an inclined cutter bearing generally indicated at 15 and having its axis A—A inclined to shank axis B—B, which is normally vertical, by an angle 14. The cutter indicated at 18 is rotatably mounted on bearing 15, and comprises a bowl-shaped body 20, the internal surfaces of which are complementary to the outer faces of the shank bearing. Thus the rotational axis of the cutter coincides with the bearing axis A—A.

The lower end of the shank is finished to form a cylindrical surface 21 of uniform diameter. The shank end below this cylindrical portion is recessed, as shown in Fig. 3, to receive a thrust cone or pin 22. The outer surface of the thrust pin is in part cylindrical, at 23, and of the same diameter as the shank proper above it; and this cylindrical surface merges with the downwardly disposed frusto-conical surface 24. The angle 26 (Fig. 1) between the cone axis A—A and the cone surface 24 is preferably 45°, making the total central angle of the cone 90°, though the angle may be varied somewhat as desired.

Thus bearing 15, although made of two physically separable members, is a single unitary bearing having a cylindrical portion that merges smoothly with a terminal frusto-conical portion. For practical reasons it is preferred to make the thrust cone removable, since it is then easily replaceable, but if desired the bearing can be made in one piece Shank 11 is provided with an internal, streamlined water course 30 through which circulation fluid is introduced into the well. As illustrated in Figs. 1 and 3, water course 30 communicates directly with central passage 31 in the thrust pin and terminates in orifice 32 which admits water to the well through the opening in the bottom of cutter 20. One or more auxiliary fluid passages 34—preferably two—lead from central passage 31 (see Fig. 3) and open directly to the conical bearing surface 24. Passages 36 lead from passages 34 to an annular passage 38 in the cylindrical portion of bearing 15, this annular passage being formed by cutting back part of the rim of thrust pin 22 to form a small gap between it and the shank above. By means of these several passages circulating fluid is delivered from the central water course to lubricate the bearing surfaces. A branch water course 40 leads from passage 30, and discharges exteriorly of the shank through water nozzle 41 which directs a jet of circulating fluid against the cutter blades to wash off adhering dirt particles.

Cutter 18 may be of any suitable type, but is here shown as having a bowl-shaped body 20 with internal bearing surfaces, and with a plurality of cutting blades 42. These blades may be of various outlines and shapes depending upon the formation being drilled. The characteristic cutting action of this bit and cutter is described in my patents mentioned above and in my companion application entitled "Cutter for drill bit" filed on October 26, 1934, Ser. No. 750,078, to which reference is made for additional details.

The cutter is placed on the bearing by axial movement, and is held against removal by suitable locking means. Such means include an annular ball-holding channel formed partly in the shank bearing, by concave annular groove 46 in face 21, and partly in the cutter, by a complementary annular groove 47 in the internal face of body 20, and a plurality of balls 48 within the channel. These balls are preferably of a diameter somewhat less than the total width of the ball channel so that they do not act as bearings, but the cutter receives all of its support directly from the shank.

In order to introduce the balls to the channel and to remove them therefrom, there is provided recess 52 entirely in shank 11, as shown particularly in Figs. 2 and 3. The recess opens to the outside at a point above the cutter and extends down to the bottom of groove 46, and is of sufficient depth that the balls may pass freely through it when the cutter is mounted. When the bit is assembled, the balls are held in the channel by means of lock plug 53 which completely fills the lower portion of the recess and is secured in place by screw 55 counter-sunk into the upper portion of the plug. Screw 55 is located at a point beneath the top edge of cutter 20 so as to be substantially completely covered by the cutter and thus protected against injury.

A notch 56 is made in the top rim of the cutter body to afford access to screw 55, as may be seen in Figs. 2 and 3. Notch 56 does not extend into the cutter as far as groove 47, so that the cutter body above the ball channel still provides a circumferentially continuous bearing surface. The outside face of plug 53 is convex and forms a continuation of the cylindrical face of the shank, so that the shank is likewise provided with a circumferentially continuous bearing surface above the ball channel.

As will be clear from the drawing, after removal of screw 55, it is necessary to displace plug 53 vertically upward in order to remove it from recess 52; and, as an additional safety measure, it is preferred to place in the upper portion of recess 52 a safety set screw 57 which serves as an abutment to prevent such vertical movement. Set screw 57 is of the ordinary socket type with a cylindrical head of such dimension as to firmly contact the top face of plug 53. By this construction, it is almost impossible for screw 55 to come out or be lost after the bit enters the well; and plug 53 is additionally secured in place by the safety screw. Displacement of plug 53 when in the well may be a serious matter, for then the balls can eventually leave their channel. If this occurs, the cutter is dropped in the well and losses amounting to thousands of dollars may ensue. Hence, every precaution against loss or damage to plug 53 and screw 55 is advisable.

In general, the cutting action of the bit is the same peculiar gyratory movement described in my aforementioned patents and to which reference is made for a detailed explanation. In bits of this type, cutter axis A—A moves in a conical locus and the cutter revolves about this axis on bearing 15 at the same time, with the result that the several cutting blades are moved successively into digging position, which is the lowermost or right hand position of Fig. 1. To accomplish this digging action, the drill stem and shank normally rotate in a clockwise direction, when viewed from above as in Fig. 4, and the cutter rotates in the same direction relative to the earth, but usually only about one-fourth as fast, so that it revolves about axis A—A counter-clockwise relative to the shank bearing. Thus the cutter rim covers screw 55 nearly all the time.

As the bit rotates, the front side of the bearing 15, the side seen in Fig. 1, is the advancing or leading side which presses against the cutter body to roll it around the bore being drilled; while the opposite or back side of the cutter, i. e. the side seen in Fig. 3, is the trailing side of the bearing and upon this side is the minimum pressure between the cutter and bearing. The combined vertical load on the cutter and the torque rotating the cutter in the hole produce a resultant force the exact position of which varies, but which is at some point ahead of the under side 15a of the bearing and so is located in the lower quadrant of the advancing side of the bearing, indicated at 60 in Fig. 4. Consequently the greatest unit pressures occur about the center of quadrant 60 in the vicinity indicated at 61 in Fig. 4, decreasing in both directions from this point; and the greatest amount of wear obviously tends to occur over the same area.

This area of high pressures is provided with the best shank surface by placing recess 52 on the trailing side of the shank where pressure and wear on plug 53 are much less. Although it is not necessary to place the recess in the exact position shown, it is preferably at least 90° around surface 21 from the point of greatest pressure, and this is accomplished if it is spaced about a quarter revolution from the under side 15a of bearing 15 and in a direction opposite to the direction of shank rotation, i. e. counter-clockwise.

The effectiveness of the bearing is also increased by making notch 56 as small as practical so the cutter body has as much inner surface as possible and always has some bearing above the ball channel.

With plain cylindrical bearings or certain types of cones, it has been found that they wear excessively rapidly over the area of greatest pressure, quadrant 60. The pressure of bearing 15 against cutter body 20 keeps the surfaces in contact in quadrant 60 so that after a time bearing is had chiefly over the worn areas, or only a part of the cutter bearing, so the wear is faster than before. With the uneven wear, the cutter becomes loose on the bearing and wears most at the lower end of the shank bearing, thus causing the axis of cutter rotation to tilt and cease to be concentric with A—A. This tilting of the cutter results in undue wear on the upper side of the shank bearing, in the general vicinity of water nozzle 41. And at all times wear causes a looser fit on the bearing which increases the rate of wear.

When the shank bearing is formed with a conical portion as shown, these evils are corrected. The cylindrical surface 21 takes radial thrust and the conical surface 24 takes axial thrust along A—A. Conical surface 24 lies at such an angle 26 with axis A—A that all elements of the cone are inclined downwardly and inwardly. When the vertical drilling weight is applied to the sloping under surface of cone 24, there results a component parallel to the cone surface which forces the shank along the cutter surface toward the center of the cutter; or, looking at it in another light, the upward reaction of the cutter has a component upwardly along the conical bearing. This component parallel to the conical surface continually centers the shank and cutter relative to each other, and is opposed by contact of the cutter on the opposite or upper side of the cone surface. In this way the bearing pressure is distributed substantially equally over the entire surface of cone 24 and as a result wear takes place evenly over the bearing. In actual practice, shanks after drilling for several hours show the wear to be substantially uniform over the entire bearing 15, both on the conical and on the cylindrical surfaces. This means that the bearing formation is such that the unit bearing pressures are lower and are maintained at a relatively uniform low value so that the life of a shank bearing is several times as long as has been obtained heretofore. Obviously this effects very important savings in the cost of repairing and maintaining shanks.

Axis A—A is inclined at an angle 14 of 30°, while half the cone central angle is 45°, thus forming a cone in which all surface elements slope downwardly and inwardly. The general relation of angle 26, which is half the central angle of the cone, to angle 14, the inclination from the vertical of axis A—A, is that the complement of angle 26 is greater than angle 14.

The central angle of the cone is preferably 90° as shown, since it conforms to the relation above mentioned and further forms a cone which is free from any danger of binding or freezing in the bearing. This angle may be changed within limits, but if the angle is made too large the centering effect is lessened or lost entirely, and if made too small there is danger of the cutter binding on the bearing.

Initial running of the bit causes the cone surface and the cutter to wear in more snugly than when first fitted in the shop, so that the bearing efficiency is actually improved. Additional wear on cone 24 maintains this close fit, and the drilling weight keeps the thrust surface in continual contact over its entire area. The elongation of cutter grooves 47 parallel to axis A—A allows a limited amount of cutter movement axially of the bearing so that as the parts wear the cutter may move to maintain the bearing contact, whereas if no such axial movement were permitted, wear would eventually prevent contact on the thrust surfaces.

Unequal pressure distribution and uneven wear, causing tilting of the cutter and further uneven wear, are remedied by the combination of a bearing having a cylindrical part of uniform diameter and a lower conical portion. The cone centers the bearing and the cutter while the relatively longer cylindrical portion gives the necessary area and length to have low unit pressure and to take the radial bearing forces, thus keeping the cutter axis always properly alined.

It is intended that the foregoing description be considered as illustrative of rather than restrictive upon the broader claims appended hereto, for various changes in construction and proportion of the parts may be made without departing from the spirit and scope of my invention.

I claim as my invention:

1. In a drill bit of the gyratory type, an inclined bearing for a rotatable cutter, said bearing comprising a cylindrical portion of substantially uniform diameter to take radial load and a frusto-conical portion below the cylindrical portion forming the terminal portion of said cutter bearing to take substantially the entire axial thrust.

2. In a drill bit of the gyratory type, an inclined bearing for a rotatable cutter, said bearing comprising a cylindrical portion of substantially uniform diameter to take radial load and a termal frusto-conical portion below the cylindrical portion forming the terminal portion of said cutter bearing to take substantially the entire axial thrust, and cutter retaining means permitting limited movement of the cutter axially of the bearing.

3. In a drill bit of the gyratory type, an inclined bearing for a rotatable cutter, said bearing comprising a cylindrical portion of substantially uniform diameter to take radial load and a frusto-conical portion below the cylindrical portion designed to take substantially the entire axial thrust, all sides of the frusto-conical portion sloping downwardly and inwardly relative to a line through the projected apex of such frusto-conical portion and parallel to the axis of such bit to center the bearing within the cutter.

4. In a drill bit of the gyratory type, an inclined bearing for a rotatable cutter, said bearing comprising a cylindrical portion of substantially uniform diameter and a co-axial frusto-conical portion below the cylindrical portion, the frusto-conical portion being so constructed and arranged that the complement of one half the central angle of the frusto-conical surface is greater than the inclination of the bearing from the vertical.

5. In a drill bit of the gyratory type, an inclined bearing for a rotatable cutter, said bearing comprising a cylindrical portion and a frusto-conical portion below the cylindrical portion, forming the terminal portion of such cutter bearing, the sides of such frusto-conical portion making a sufficient angle with the axis of the bit that the lowest side of the cone is inclined to the horizontal, whereby the drilling weight on the cutter has a component upon all portions of the frusto-conical bearing surface directed upwardly and whereby such bearing is self centering.

6. In a drill bit of the gyratory type having a shank and a rotatable cutter, a bearing for said cutter, comprising a cylindrical portion integral with the shank and a removable thrust pin; the thrust pin comprising a downwardly converging frusto-conical portion having a central angle of approximately 90° surmounted by a relatively short cylindrical portion forming a continuation of the first mentioned cylindrical portion, and a water course extending axially of the pin and adapted to discharge circulating fluid at the lower end of the frusto-conical portion.

7. In a drill bit, the combination of a shank adapted for attachment to a drill column for rotation thereby and having an inclined cutter bearing portion, a cutter rotatably mounted on the inclined bearing, and lock means holding the cutter against axial removal from the bearing; said locking means comprising a ball channel formed partly in the cutter and partly in the bearing, a plurality of balls in said channel, a recess in the shank bearing extending from a point above the cutter down to the channel to admit and remove balls from the channel, and a plug secured in the recess by a screw to hold the balls in the channel, the plug screw being located below the top of the cutter to be covered normally by the top portion of the cutter, and access to the screw being afforded by a notch in the cutter rim.

8. In a drill bit, the combination of a shank adapted for attachment to a drill column for rotation thereby and having an inclined cutter bearing portion, a cutter rotatably mounted on the inclined bearing, and lock means holding the cutter against axial removal from the bearing; said locking means comprising a ball channel formed partly in the cutter and partly in the bearing, a plurality of balls in said channel, a recess in the shank bearing extending from a point above the cutter down to the channel to admit and remove balls from the channel, a plug secured in the recess by a screw to hold the balls in the channel, and a removable abutment member within the top end of the recess preventing upward movement of the plug.

9. In a drill bit, the combination of a shank adapted for attachment to a drill column for rotation thereby and having an inclined cutter bearing portion, a cutter rotatably mounted on the inclined bearing, and lock means holding the cutter against axial removal from the bearing; said locking means comprising a ball channel formed partly in the cutter and partly in the bearing, a plurality of balls in said channel, a recess in the shank bearing extending from a point above the cutter down to the channel to admit and remove balls from the channel, a plug secured in the recess by a screw to hold the balls in the channel, and a removable abutment member within the top end of the recess preventing upward movement of the plug; the plug screw being located below the top of the cutter to be covered normally by the top portion of the cutter, and access to the screw being afforded by a notch in the cutter rim.

10. A drill bit of the character described comprising a shank bearing portion; a cutter rotatably mounted on the bearing; and lock means holding the cutter on the bearing, comprising a ball channel formed partly in the bearing and partly in the cutter, a plurality of balls in the channel holding the cutter against removal, a recess entirely in the bearing extending from a point above the cutter down to the ball channel to admit and remove balls from the channel and a plug secured in the recess to hold the balls in the channel; the cutter having a continuous inner surface above the channel and the plug having a convex outer face in continuation of the shank surface to provide a continuous bearing for the cutter above the ball channel.

11. A drill bit of the character described comprising a shank bearing portion; a cutter rotatably mounted on the bearing; and lock means holding the cutter on the bearing, comprising a ball channel formed partly in the bearing and partly in the cutter, a plurality of balls in the channel holding the cutter against removal, a recess entirely in the bearing extending from a point above the cutter down to the ball channel to admit and remove balls from the channel, and a plug secured in the recess to hold the balls in the channel; the cutter having continuous internal surfaces of uniform diameter above and below the ball channel, and the plug having a convex outer surface adapted to provide bearing for the cutter so that the shank has continuous surfaces of uniform diameter above and below the channel for bearing engagement with the respective cutter internal surfaces.

12. A drill bit of the character described comprising a shank bearing portion; a cutter rotatably mounted on the bearing; and lock means holding the cutter on the bearing, comprising a ball channel formed partly in the bearing and partly in the cutter, a plurality of balls in the channel holding the cutter against removal and being of less diameter than the total width of the ball channel so as not to afford bearing for the cutter, a recess entirely in the bearing extending from a point above the cutter down to the ball channel to admit and remove balls from the channel, and a plug secured in the recess to hold the balls in the channel; the cutter and shank having mutually contacting bearing surfaces above and below the ball channel.

13. As an article of manufacture, a detachable thrust pin for the shank of a gyratory bit, comprising a conical portion providing an external bearing surface converging downwardly and terminating at the lower end of the pin, said conical portion having a central angle of substantially 90°, a relatively short cylindrical portion providing an external bearing surface merging with and in extension of the upper end of the conical surface, and a cylindrical axial fluid passage through the entire pin.

14. As an article of manufacture, a detachable thrust pin for the shank of a gyratory bit, comprising a conical portion providing an external bearing surface converging downwardly and terminating at the lower end of the pin, a relatively short cylindrical portion providing an external bearing surface merging with and in extension of the upper end of the conical surface, an axial fluid passage through the pin having an upper cylindrical section of relatively large diameter and a lower cylindrical section of smaller diameter, and a lubricant passage intersecting the axial passage at the junction of the large and small sections and leading to the conical bearing surface so that the construction in the axial passage forces fluid through the lubricant passage to lubricate the conical bearing.

15. In a drill bit of the gyratory type and including a rotatable cutter, an inclined bearing therefor, said bearing comprising a frusto-conical bearing surface at the lowermost portion thereof adapted to absorb substantially the entire axial thrust of the drilling load, and a cylindrical bearing surface above and spaced from said frusto-conical surface to absorb a portion of the radial drilling load.

16. In a drill bit of the gyratory type and including a rotatable cutter, an inclined bearing therefor, said bearing comprising a frusto-conical bearing surface at the lowermost portion thereof adapted to absorb substantially the entire axial thrust of the drilling load, a cylindrical bearing surface above and spaced from said frusto-conical surface to absorb a portion of the radial drilling load, and locking means for retaining the cutter on such bearing, said means permitting a limited movement of the cutter axially to the bearing.

17. In a drill bit of the gyratory type and including a shank and rotatable cutter therefor, an inclined bearing for such cutter, said bearing comprising a frusto-conical bearing surface at the lowermost portion thereof adapted to absorb substantially the entire axial thrust of the drilling load, and a cylindrical bearing surface above and spaced from said frusto-conical surface to absorb a portion of the radial drilling load, all surfaces of the frusto-conical surface sloping downwardly and inwardly toward a line parallel to the shank axis which passes through the apex of the generating cone of such frusto-conical surface.

18. In a drill bit of the gyratory type and including a shank and rotatable cutter therefor, an inclined bearing for such cutter, said bearing comprising a frusto-conical bearing surface at the lowermost portion thereof adapted to absorb substantially the entire axial thrust of the drilling load, and a cylindrical bearing surface above and spaced from said frusto-conical surface to absorb a portion of the radial drilling load, said frusto-conical surface making an angle with a plane perpendicular to its axis greater than the angle of inclination of such axis to the shank axis.

19. In a drill bit of the gyratory type and including a shank and rotatable cutter therefor, an inclined bearing for such cutter, said bearing comprising a frusto-conical bearing surface at the lowermost portion thereof adapted to absorb substantially the entire axial thrust of the drilling load, and a cylindrical bearing surface above and spaced from said frusto-conical surface to absorb a portion of the radial drilling loads, the sides of such frusto-conical surface making such an angle with the central axis thereof and with the shank axis that all sides of such frusto-conical surface are inclined upwardly from the cone apex when the shank axis is vertical, whereby the drilling weight upon such cutter continuously tends to force such cutter upwardly and centrally on said bearing.

JOHN A. ZUBLIN.

CERTIFICATE OF CORRECTION.

Patent No. 2,025,259.  December 24, 1935.

JOHN A. ZUBLIN.

It is hereby certified that error appears in the printed specification of the above numbered patent requiring correction as follows: Page 5, first column, line 17, claim 14, for "construction" read constriction; and that the said Letters Patent should be read with this correction therein that the same may conform to the record of the case in the Patent Office.

Signed and sealed this 4th day of February, A. D. 1936.

Leslie Frazer
Acting Commissioner of Patents.

(Seal)